United States Patent
Landvik et al.

(10) Patent No.: US 11,229,214 B2
(45) Date of Patent: Jan. 25, 2022

(54) METHOD OF BAKING

(71) Applicant: Novozymes A/S, Bagsvaerd (DK)

(72) Inventors: Sara Maria Landvik, Vedbaek (DK); Henrik Lundkvist, Malmo (SE); Lisbeth Kalum, Vaerloese (DK); Jesper Vind, Vaerloese (DK); Anna Verena Reiser, Copenhagen (DK); Helle Niemann, Bagsvaerd (DK)

(73) Assignee: Novozymes A/S, Bagsvaerd (DK)

( * ) Notice: Subject to any disclaimer, the term of this patent is extended or adjusted under 35 U.S.C. 154(b) by 109 days.

(21) Appl. No.: 16/463,052

(22) PCT Filed: Nov. 29, 2017

(86) PCT No.: PCT/EP2017/080811
§ 371 (c)(1),
(2) Date: May 22, 2019

(87) PCT Pub. No.: WO2018/099965
PCT Pub. Date: Jun. 7, 2018

(65) Prior Publication Data
US 2019/0274318 A1    Sep. 12, 2019

(30) Foreign Application Priority Data
Nov. 30, 2016   (EP) ..................................... 16201416

(51) Int. Cl.
*A21D 8/04*     (2006.01)
*A21D 2/26*     (2006.01)

(52) U.S. Cl.
CPC ............... *A21D 8/042* (2013.01); *A21D 2/26* (2013.01); *C12Y 301/04011* (2013.01)

(58) Field of Classification Search
CPC ... A21D 8/042; A21D 2/26; C12Y 301/04011
USPC .......................................................... 426/20
See application file for complete search history.

(56) References Cited

U.S. PATENT DOCUMENTS

| | | | |
|---|---|---|---|
| 6,110,508 A * | 8/2000 | Olesen .................. | A21D 8/042 426/20 |
| 2006/0281080 A1 | 12/2006 | Albang et al. | |
| 2010/0086640 A1 | 4/2010 | Brunstedt et al. | |
| 2013/0323359 A1 | 12/2013 | Budolfsen | |
| 2015/0017281 A1 | 1/2015 | Borch et al. | |

FOREIGN PATENT DOCUMENTS

WO    2016/005315 A1    1/2016

\* cited by examiner

*Primary Examiner* — Hamid R Badr
(74) *Attorney, Agent, or Firm* — Elias Lambiris

(57) ABSTRACT

A method for preparing a dough or a baked product prepared from the dough which method comprises incorporating into the dough a lipolytic enzyme, wherein the lipolytic enzyme has an amino acid sequence which has at least 50% sequence identity to amino acids 20 to 254 of SEQ ID NO: 1.

20 Claims, No Drawings
Specification includes a Sequence Listing.

SEQUENCE LISTING

<160> NUMBER OF SEQ ID NOS: 10

<210> SEQ ID NO 1
<211> LENGTH: 254

```
<212> TYPE: PRT
<213> ORGANISM: Aspergillus oryzae
<220> FEATURE:
<221> NAME/KEY: SIGNAL
<222> LOCATION: (1)..(19)

<400> SEQUENCE: 1

Met His Leu Ala Ile Lys Ser Leu Phe Val Ser Leu Leu Gly Ala Ser
1               5                   10                  15

Val Leu Ala Ser Pro Leu Pro Ser Asn Ala Leu Val Glu Arg Asn Ala
            20                  25                  30

Pro Leu Asn Glu Phe Leu Ser Ala Leu Leu Ser His Leu Pro Ala Ile
        35                  40                  45

Asp Gly Thr Ile Asp Ala Val Ser Gly Val Ile Thr Asp Phe Asp Gln
    50                  55                  60

Leu Leu Ala Asp Leu Thr Gly Ala Arg Thr Thr Gln Asn Gly Tyr Ile
65                  70                  75                  80

Gly Val Cys Thr Asp Tyr Thr Val Leu Phe Ala Arg Gly Thr Ser Glu
                85                  90                  95

Pro Gly Asn Val Gly Val Leu Val Gly Pro Pro Leu Ser Glu Ala Phe
            100                 105                 110

Glu Gln Ala Val Gly Ala Lys Ala Leu Ser Phe Gln Gly Val Asn Gly
        115                 120                 125

Tyr Asn Ala Asp Val Ala Gly Tyr Leu Ala Gly Asp Ala Ala Gly
    130                 135                 140

Ser Lys Ser Met Ala Ser Leu Ala Ser Glu Val Leu Ser Lys Cys Pro
145                 150                 155                 160

Asp Thr Lys Leu Val Met Ser Gly Tyr Ser Gln Gly Cys Gln Ile Val
                165                 170                 175

His Asn Ala Val Glu Gln Leu Pro Ala Ala Asp Ala Ser Lys Ile Ser
            180                 185                 190

Ser Val Leu Leu Phe Gly Asp Pro Tyr Ala Gly Lys Ala Phe Pro Asn
        195                 200                 205

Val Asp Ala Ser Arg Val His Thr Val Cys His Ala Gly Asp Thr Ile
    210                 215                 220

Cys Asn Asn Ser Val Val Ile Leu Pro Pro His Leu Thr Tyr Ala Val
225                 230                 235                 240

Asp Val Thr Asn Ala Val Gln Phe Ala Val Ala Ala Asn
                245                 250

<210> SEQ ID NO 2
<211> LENGTH: 957
<212> TYPE: DNA
<213> ORGANISM: Aspergillus oryzae

<400> SEQUENCE: 2
atgcatcttg ctatcaagtc tctctttgtc tctctcctcg gagccagcgt tctcgcaagc        60
cctcttccca gcaatgctct ggttgagaga aacgctcccc tgaatgagtt cctcagcgct       120
cttctgtcgc atctgcctgc catcgatggc accatcgacg cggtgtcggg tgtgatcacc       180
gattttgatc aattgctcgc cgacctcact ggtgctcgaa ccacacaaaa tggatatatt       240
ggtgtctgca cggactacac cgttctcttc gcccgcggaa ccagtgagcc cggaaacgta       300
agcttcgttg ccttagtgct tatttccatt ctaactttgt gcaggtcggt gtccttgttg       360
gacctcctct ttctgaagcg tttgagcaag ccgtcggtgc aaaagccttg agcttccagg       420
gcgtcaacgg ctataacgca gatgtcgcgg gttatttggc tggaggtgac gctgccggta       480
```

```
gcaagtcaat gtacgtctct tctctattgt gtcgcaacct tctcgctcta ttccgatgga    540
caatgaaaat cgcagctgac attattcgaa cagggcatcc ctggccagcg aagttctctc    600
caaatgtcct gacactaagc tcgtcatgag cggctactct cagggttgcc agattgttca    660
caacgccgtt gagcagctcc ctgccgcaga cgctagcaag atcagcagcg tcctcctctt    720
cggagaccca tgtacgttaa attccaaggc cgtggggatt attgatgtat gaaacatgct    780
gattatttta tagacgcggg caaggccttc cccaacgttg atgcttcccg tgtgcacact    840
gtgtgccacg ccggagatac tatttgcaac aacagcgtcg ttatcctgcc ccctcacctg    900
acctacgctg ttgatgtgac taacgcggtt caatttgctg ttgcggctgc gaactaa      957
```

<210> SEQ ID NO 3
<211> LENGTH: 50
<212> TYPE: DNA
<213> ORGANISM: Artificial sequence
<220> FEATURE:
<223> OTHER INFORMATION: Primer

<400> SEQUENCE: 3

```
acacaactgg ggatccacca tgcatcttgc tatcaagtct ctctttgtct                50
```

<210> SEQ ID NO 4
<211> LENGTH: 37
<212> TYPE: DNA
<213> ORGANISM: Artificial sequence
<220> FEATURE:
<223> OTHER INFORMATION: Primer

<400> SEQUENCE: 4

```
ctagatctcg agaagcttgt tcgcagccgc aacagca                              37
```

<210> SEQ ID NO 5
<211> LENGTH: 255
<212> TYPE: PRT
<213> ORGANISM: Penicillum sp

<400> SEQUENCE: 5

```
Met Ile Leu Gln Leu Arg Tyr Leu Ala Leu Ile Phe Phe Gly Leu His
 1               5                  10                  15

Ala Tyr Ala Val Pro Leu Ala Asp Arg Glu Val His His Leu Lys Glu
            20                  25                  30

Arg Gly Ala Gly Leu Asn Ser Phe Leu Asn Phe Leu Leu Ser Tyr Leu
        35                  40                  45

Pro Ala Ile Asn Thr Ser Ile Thr Asp Ala Thr Gly Leu Ile Thr Asp
    50                  55                  60

Phe Asp Lys Leu Leu Gly Gly Leu Thr Gly Ala Gln Thr Thr Tyr Asn
65                  70                  75                  80

Glu Leu Gly Gly Ala Cys Thr Ala Tyr Thr Val Ile Phe Ala Arg Gly
                85                  90                  95

Thr Ala Glu Pro Gly Asn Val Gly Val Leu Val Gly Pro Pro Leu Phe
            100                 105                 110

Asp Ala Leu Asp Asp Lys Phe Gly Ser Ser Ala Leu Thr Ile Gln Gly
        115                 120                 125

Val Asn Gly Tyr Ser Ala Ser Val Gln Gly Tyr Leu Ala Gly Gly Asp
    130                 135                 140

Pro Ser Gly Ser Ala Ser Met Ala Asn Gln Ile Lys Ala Ala Lys Ala
145                 150                 155                 160
```

Gln Cys Pro Lys Thr Lys Leu Ile Ala Ser Gly Tyr Ser Gln Gly Cys
                165                 170                 175

Gln Ile Val His Asn Ala Ile Ser Gln Leu Asp Ala Thr Thr Ala Ser
            180                 185                 190

Trp Ile Ser Ser Val Leu Leu Phe Gly Asp Pro Leu Lys Gly Gln Ala
        195                 200                 205

Leu Lys Asn Val Pro Ala Ser Arg Val Phe Thr Ala Cys His Ala Leu
    210                 215                 220

Asp Asp Ile Cys Lys Asp Gly Leu Ile Ile Gly Pro Ser His Leu Thr
225                 230                 235                 240

Tyr Ala Ile Asp Val Thr Asn Ala Ala Asn Phe Ala Ala Ala Val
                245                 250                 255

<210> SEQ ID NO 6
<211> LENGTH: 256
<212> TYPE: PRT
<213> ORGANISM: Penicillium samsonianum

<400> SEQUENCE: 6

Met Leu Phe Lys Leu Glu Phe Met Leu Leu Thr Leu Gly Leu Asn
1               5                   10                  15

Thr Tyr Ala Thr Pro Leu Pro Ala Ala Ser Glu Met Gln Leu Thr Lys
            20                  25                  30

Arg Asp Ala Gly Leu Asn Ala Phe Leu Gly Ile Leu Ile Asp His Leu
        35                  40                  45

Pro Ala Val Ser Glu Ser Leu Thr Glu Ser Thr Ser Leu Ile Thr Ser
    50                  55                  60

Phe Asp Lys Leu Leu Gly Ala Leu Thr Gly Ala Gln Glu Thr Tyr Asn
65                  70                  75                  80

Glu Ala Gly Gly Thr Cys Lys Glu Trp Thr Val Val Phe Ala Arg Gly
                85                  90                  95

Thr Ala Glu Pro Gly Asn Val Gly Val Leu Val Gly Pro Pro Leu Phe
            100                 105                 110

Asp Ala Leu Ala Asp Lys Phe Gly Arg Ser Ala Leu Thr Ile Gln Gly
        115                 120                 125

Val Asn Asp Tyr Ser Ala Ser Val Gln Gly Tyr Leu Ala Gly Gly Asp
    130                 135                 140

Ala Ala Gly Thr Ala Glu Met Ala Arg Gln Ile Glu Ser Val Lys Ser
145                 150                 155                 160

Gln Cys Pro Asp Thr Lys Leu Ile Ala Ser Gly Tyr Ser Gln Gly Cys
                165                 170                 175

Gln Ile Val His Asn Ala Val Ala Lys Leu Glu Ala Thr Thr Ala Ser
            180                 185                 190

Trp Ile Ser Ser Val Leu Leu Phe Gly Asp Pro Lys Asp Lys Gln Ala
        195                 200                 205

Leu Ser Asn Ile Pro Ala Ser Lys Val Tyr Thr Ala Cys His Ala Gly
    210                 215                 220

Asp Asp Ile Cys Lys Asn Gly Val Leu Ile Gly Pro Pro His Leu Thr
225                 230                 235                 240

Tyr Ala Leu Asp Val Thr Asp Val Ala Phe Ala Ala Asn Ala Ala
                245                 250                 255

<210> SEQ ID NO 7
<211> LENGTH: 259
<212> TYPE: PRT
<213> ORGANISM: Rasamsonia brevistipitata

<400> SEQUENCE: 7

Met Leu Ser Lys Leu Ser Ile Gly Ala Leu Leu Pro Phe Phe Leu Gly
1               5                   10                  15

Thr Leu Ala Ser Pro Leu Pro Val Pro Ala Asp Leu Ser Leu Leu Val
            20                  25                  30

Glu Arg Asn Ala Pro Leu Asn Gln Phe Leu Ser Leu Leu Val Asp Tyr
        35                  40                  45

Leu Pro Ala Ile Asn Glu Thr Leu Ser Asp Ala Ser Ser Val Ile Thr
    50                  55                  60

Gly Leu Asp Thr Val Leu Ala Asp Val Leu Asp Leu Gln Thr Thr Tyr
65                  70                  75                  80

Asn Gln Leu Gly Ser Gly Ser Cys Thr Ala Tyr Thr Leu Leu Phe Ala
                85                  90                  95

Arg Gly Thr Ser Glu Pro Gly Asn Val Gly Val Leu Val Gly Pro Pro
            100                 105                 110

Leu Phe Met Ala Leu Gln Thr Leu Ile Asn Pro Ser Asp Leu Thr Ile
        115                 120                 125

Gln Gly Val Asn Asn Tyr Ala Ala Ser Ile Glu Gly Tyr Leu Glu Gly
    130                 135                 140

Gly Asp Pro Ala Gly Ser Ala Glu Met Ala Gln Gln Ile Gln Gln Ala
145                 150                 155                 160

His Ser Ala Cys Pro Asn Thr Lys Leu Ile Val Ser Gly Tyr Ser Gln
                165                 170                 175

Gly Ser Gln Ile Val His Asn Ala Ile Gly Gln Leu Pro Ala Ala Thr
            180                 185                 190

Ala Ser Trp Ile Ser Ser Val Leu Leu Phe Gly Asp Pro Asp Asp Gly
        195                 200                 205

Gln Ala Leu Pro Ser Val Ala Ala Ser Lys Val Asn Thr Val Cys His
    210                 215                 220

Asp Gly Asp Asp Ile Cys Ser Asn Gly Ile Phe Ile Leu Pro Ala His
225                 230                 235                 240

Leu Thr Tyr Ala Glu Asn Val Ala Thr Ala Ala Ser Phe Ala Leu Ala
                245                 250                 255

Ala Ala Ser

<210> SEQ ID NO 8
<211> LENGTH: 255
<212> TYPE: PRT
<213> ORGANISM: Penicillium sp

<400> SEQUENCE: 8

Met Phe Phe Lys Leu Gln Ser Leu Ala Val Ile Phe Leu Gly Leu Asn
1               5                   10                  15

Ala Tyr Ala Phe Pro Leu Ala Glu Pro Asn Glu Val His Ile Ser Glu
            20                  25                  30

Arg Gly Ala Gly Leu Asn Ser Phe Leu Asn Ile Leu Leu Ser His Leu
        35                  40                  45

Pro Ala Ile Asp Thr Ser Ile Thr Asp Ala Thr Gly Ile Ile Thr Ser
    50                  55                  60

Phe Asp Asn Leu Leu Gly Ala Leu Thr Gly Ala Gln Glu Thr Tyr Asn
65                  70                  75                  80

Glu Leu Gly Gly Ser Cys Thr Glu Trp Thr Val Ile Phe Ala Arg Gly
                85                  90                  95

Thr Ala Glu Pro Gly Asn Val Gly Val Leu Val Gly Pro Pro Leu Phe
            100                 105                 110

Asp Ala Met Asp Asp Lys Phe Gly Thr Ser Ala Ile Thr Ile Gln Gly
        115                 120                 125

Val Asn Asp Tyr Ser Ala Ser Val Gln Gly Tyr Leu Ala Gly Gly Asp
    130                 135                 140

Ser Asn Gly Ser Ala Glu Met Ala Arg Gln Ile Lys Ala Ala Lys Ser
145                 150                 155                 160

Gln Cys Pro His Thr Lys Leu Ile Ala Ser Gly Tyr Ser Gln Gly Cys
                165                 170                 175

Gln Ile Val His Lys Ala Ile Ala Gln Leu Asp Ser Thr Thr Ala Ser
            180                 185                 190

Trp Ile Ser Ser Val Leu Leu Phe Gly Asp Pro Leu Lys Gly Gln Ala
        195                 200                 205

Leu Asn Ser Val Pro Ser Ser Arg Val Phe Thr Ala Cys His Ala Leu
    210                 215                 220

Asp Asp Ile Cys Lys Asn Gly Ile Leu Ile Gly Pro Ser His Leu Thr
225                 230                 235                 240

Tyr Ala Val Asp Val Val Asn Ala Val Asn Phe Ala Ala Ala His
                245                 250                 255

<210> SEQ ID NO 9
<211> LENGTH: 255
<212> TYPE: PRT
<213> ORGANISM: Aspergillus tamarii

<400> SEQUENCE: 9

Met His Leu Pro Ile Lys Thr Leu Phe Val Ser Leu Leu Gly Ala Ser
1               5                   10                  15

Val Leu Ala Arg Pro Leu Pro Asn Asp Ala Leu Val Glu Arg Asn Ala
            20                  25                  30

Pro Leu Asn Glu Phe Leu Ser Val Leu Leu Ser His Leu Pro Ala Ile
        35                  40                  45

Asn Gly Ser Ile Thr Ala Val Ser Gly Leu Ile Thr Asp Phe Asp Gln
    50                  55                  60

Leu Leu Ala Asp Ile Thr Gly Ala Gln Thr Thr Leu Asn Gly Phe Thr
65                  70                  75                  80

Gly Ala Cys Thr Asp Tyr Thr Val Leu Phe Ala Arg Gly Thr Ser Glu
                85                  90                  95

Pro Gly Asn Val Gly Val Leu Val Gly Pro Pro Leu Ala Glu Ala Phe
            100                 105                 110

Glu Gly Ala Val Gly Ala Ser Ala Leu Ser Phe Gln Gly Val Asn Gly
        115                 120                 125

Tyr Ser Ala Ser Val Glu Gly Tyr Leu Ala Gly Gly Glu Ala Ala Gly
    130                 135                 140

Ser Lys Ala Met Ala Ser Gln Ala Ser Asp Ile Leu Ser Lys Cys Pro
145                 150                 155                 160

Asp Thr Lys Leu Val Met Ser Gly Tyr Ser Gln Gly Cys Gln Ile Val
                165                 170                 175

His Asn Ala Val Glu Gln Leu Pro Ala Glu His Ala Ser Lys Ile Ser
            180                 185                 190

Ser Val Leu Leu Phe Gly Asp Pro Tyr Lys Gly Lys Ala Leu Pro Asn
        195                 200                 205

Val Asp Ala Ser Arg Val His Thr Val Cys His Ala Gly Asp Thr Ile
    210                 215                 220

```
Cys Glu Asn Ser Val Ile Ile Leu Pro Ala His Leu Thr Tyr Ala Val
225                 230                 235                 240

Asp Val Ala Ser Ala Ala Asp Phe Ala Val Ala Ala Lys Asn
            245                 250                 255
```

<210> SEQ ID NO 10
<211> LENGTH: 257
<212> TYPE: PRT
<213> ORGANISM: Talaromyces leycettanus

<400> SEQUENCE: 10

```
Met Leu Leu Pro Ile Lys Ser Phe Leu Leu Ser Ala Phe Ala Leu Asn
1               5                   10                  15

Ala Leu Ala Thr Pro Leu Pro Val Pro Glu Glu His Ala Asn Val Lys
                20                  25                  30

Arg Glu Ser Ala Leu Asn Glu Tyr Leu Ser Ile Ile Leu Ser Asn Leu
            35                  40                  45

Pro Val Ile Asn Gly Ala Ile Asn Asp Val Val Gly Val Leu Ser Ser
        50                  55                  60

Phe Glu Gln Leu Ile Ala Ser Leu Thr Gly Ala Gln Thr Thr Tyr Asn
65                  70                  75                  80

Glu Leu Gly Gly Pro Cys Thr Glu Tyr Thr Ile Val Phe Ala Arg Gly
                85                  90                  95

Thr Ser Glu Pro Gly Asn Val Gly Val Leu Val Gly Pro Pro Leu Phe
            100                 105                 110

Glu Ala Leu Gln Asn Leu Val Gly Thr Ser Ala Leu Thr Ile Gln Gly
        115                 120                 125

Val Asn Asn Tyr Ala Ala Ser Val Glu Gly Tyr Leu Glu Gly Gly Asp
130                 135                 140

Pro Ala Gly Ser Ala Glu Met Ala Ser Gln Ile Glu Ala Ala Leu Ser
145                 150                 155                 160

Gln Cys Pro Asn Thr Lys Leu Ile Ala Ala Gly Tyr Ser Gln Gly Cys
                165                 170                 175

Gln Val Thr His Asn Ala Ile Gly Lys Leu Pro Ala Ser Val Gly Ser
            180                 185                 190

Lys Ile Ser Ser Val Leu Leu Phe Gly Asp Pro Asp Asp Gly Gln Ala
        195                 200                 205

Leu Pro Asn Val Pro Ala Ser Lys Val Met Thr Val Cys His Thr Gly
210                 215                 220

Asp Asp Ile Cys Gln Asp Gly Val Leu Ile Leu Pro Pro His Leu Thr
225                 230                 235                 240

Tyr Gly Glu Asp Ala Gln Ala Ala Ala Phe Ala Val Ala Ala Ala
                245                 250                 255

Ser
```

METHOD OF BAKING

CROSS-REFERENCE TO RELATED APPLICATIONS

This application is a 35 U.S.C. 371 national application of international application no. PCT/EP2017/080811 filed Nov. 29, 2017, which claims priority or the benefit under 35 U.S.C. 119 of European application no. 16201416.1 filed Nov. 30, 2016 the contents of which are fully incorporated herein by reference.

REFERENCE TO A SEQUENCE LISTING

This application contains a Sequence Listing in computer readable form, which is incorporated herein by reference.

BACKGROUND OF THE INVENTION

Field of the Invention

The present invention relates to the making of baked products, more particularly making of dough using a lipolytic enzyme for improved texture, increased volume, and increased shelf life.

Description of the Related Art

Today, high amounts of emulsifiers are used in the bread industry. Especially, emulsifiers such as diacetyl tartaric acid esters of monoglycerides (DATEM) are used in the production of baked products, in particular in the production of bread.

Emulsifiers work, i.a., by strengthening the dough gluten protein network for better gas retention, improved texture, increased volume, and increased shelf life.

There is still a need for finding improved solutions to, e.g., diacetyl tartaric acid esters of monoglycerides (DATEM) in the baking area.

SUMMARY OF THE INVENTION

The inventors have now found that a lipolytic enzyme may increase the volume of the baked product so we claim:

A method for preparing dough or a baked product prepared from the dough which method comprises incorporating into the dough a lipolytic enzyme, wherein the lipolytic enzyme has an amino acid sequence which has at least 50% sequence identity to amino acids 20 to 254 of SEQ ID NO: 1.

In one embodiment, the volume of a dough and/or a baked product is increased compared to dough wherein no lipolytic enzyme according to the invention is added.

In one embodiment, the lipolytic enzyme according to the invention is applied in an amount of 0.01-100 mg enzyme protein per kg flour, in particular 0.05-50 mg enzyme protein per kg flour, in particular 0.05-25 mg enzyme protein per kg flour, in particular 0.05-10 mg enzyme protein per kg flour in the dough.

In one embodiment, additionally one or more enzymes selected from the group consisting of amylase, alpha-amylase, maltogenic alpha-amylase, beta-amylase, glucan 1,4-alpha-maltotetrahydrolase aminopeptidase, carboxypeptidase, catalase, chitinase, cyclodextrin glycosyltransferase, deoxyribonuclease, lipolytic enzyme, galactanase, alpha-galactosidase, beta-galactosidase, glucanase, glucoamylase, glucose oxidase, alpha-glucosidase, beta-glucosidase, haloperoxidase, invertase, laccase, lipase, mannanase, mannosidase, oxidase, pectinolytic enzymes, peptidoglutaminase, peroxidase, phospholipase, phytase, polyphenoloxidase, protease, and xylanase is added to the dough.

In one embodiment, the dough according to the invention comprises flour selected from the group consisting of wheat, barley, rye, oat, corn, sorghum, rice, millet, and any mixtures thereof.

In one embodiment, the dough according to the invention comprises whole wheat.

In one embodiment, the dough according to the invention is made to a baked product or a steamed product.

In one embodiment, the dough comprises a lipolytic enzyme according to the invention and a phospholipase.

In one embodiment, the volume of a dough and/or a baked product is increased by at least 10% compared to dough and/or a baked product wherein no lipolytic enzyme according to the invention is added.

In one embodiment, a baking composition comprising a lipolytic enzyme having an amino acid sequence which has at least 50% sequence identity to amino acids 20 to 254 of SEQ ID NO: 1, and one or more baking ingredients is claimed.

In one embodiment, the baking composition according to the invention comprises baking ingredients selected from the group consisting of flour, yeast, starch, salt, and ascorbic acid.

In one embodiment, the baking composition according to invention further comprises one or more enzymes selected from the group consisting of amylase, alpha-amylase, maltogenic alpha-amylase, beta-amylase, glucan 1,4-alpha-maltotetrahydrolase, aminopeptidase, carboxypeptidase, catalase, chitinase, cyclodextrin glycosyltransferase, deoxyribonuclease, lipolytic enzyme, galactanase, alpha-galactosidase, beta-galactosidase, glucanase, glucoamylase, glucose oxidase, alpha-glucosidase, beta-glucosidase, haloperoxidase, invertase, laccase, lipase, mannanase, mannosidase, oxidase, pectinolytic enzymes, peptidoglutaminase, peroxidase, phospholipase, phytase, polyphenoloxidase, protease, and xylanase.

In one embodiment, the baking composition according to the invention comprises a polypeptide having an amino acid sequence which has at least 50% sequence identity to amino acids 20 to 254 of SEQ ID NO: 1.

In one embodiment, a baking composition comprising a lipolytic enzyme which has at least 50% sequence identity to amino acids 20 to 254 of SEQ ID NO: 1, a lipase and/or a phospholipase, and one or more baking ingredients, is claimed.

In one embodiment, a baked product obtained by baking the dough according to invention, is claimed.

Definitions

Lipolytic enzyme: The term "a lipolytic enzyme" comprises an enzyme having lipase, phospholipase and/or galactolipase activity (glyceroglycolipid lipase) activity. The term "lipolytic enzyme" is used interchangeable with the term "polypeptides having lipolytic activity".

According to the present invention, lipolytic activity may be measured by the following method:

The lipolytic activity may be determined using tributyrine as substrate. This method is based on the hydrolysis of tributyrin by the enzyme, and the alkali consumption to keep pH constant during hydrolysis is registered as a function of time.

One Lipase Unit (LU) is defined as the amount of enzyme which, under standard conditions (i.e., at 30° C.; pH 7.0; with 0.1% w/v Gum Arabic as emulsifier and 0.16 M tributyrine as substrate) liberates 1 micro mole titratable butyric acid per minute.

A useful protocol for identifying lipolytic activity is the following using tributyrin plates:
Tributyrin Substrate Mix:
15 ml Glycerintributyrat (tributyrin)
2 g gum Arabic.
285 ml $H_2O$
For 2 plates use
    5 ml tributyrin mix, add 50 ml 0.02 M Universal buffer at pH 7.0
    Prevarm to 60° C.
    Ultra turax for 60 seconds to get a smooth emulsion
Make a 2% agarose solution
    2 g for 100 ml $H_2O$
    Boil and bring the solution to 60° C. (use a water bath)
Mix 50 ml tributyrin/buffer solution with 50 ml 2% agarose, add 250 microliter 4% Crystal violet. Pour 50 ml for each plate OmniTray Single Well cat no 242811, and Nunc TSP 96 Cat no 445497. 10 microliter samples may be applied. The plates may be incubated at 30° C. for approx. 1 hour and 3 hours. The activity may be photographed.

Lipase activity: Triacylglycerol lipase activity (EC 3.1.1.3), i.e., hydrolytic activity for carboxylic ester bonds in triglycerides, e.g., olive oil and tributyrin.

Phospholipase activity: Phospholipase activity (A1 or A2, EC 3.1.1.32 or 3.1.1.4), i.e., hydrolytic activity towards one or both carboxylic ester bonds in phospholipids such as lecithin.

Galactolipase activity: Galactolipase activity (EC 3.1.1.26), i.e., hydrolytic activity on carboxylic ester bonds in galactolipids such as DGDG (digalactosyl diglyceride).

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Fragment: The term "fragment" means a polypeptide having one or more (e.g. several) amino acids absent from the amino and/or carboxyl terminus of a mature polypeptide or domain; wherein the fragment has lipolytic enzyme activity.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g. multiple copies of a gene encoding the substance; use of a stronger promoter than the promoter naturally associated with the gene encoding the substance). An isolated substance may be present in a fermentation broth sample.

Mature polypeptide: The term "mature polypeptide" means a polypeptide in its final form following translation and any post-translational modifications, such as N-terminal processing, C-terminal truncation, glycosylation, phosphorylation, etc.

In one aspect, the mature polypeptide is amino acids 20 to 254 of SEQ ID NO: 1.

Sequence identity: The relatedness between two amino acid sequences or between two nucleotide sequences is described by the parameter "sequence identity".

For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 6.6.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the –nobrief option) is used as the percent identity and is calculated as follows:

$$(\text{Identical Residues} \times 100)/(\text{Length of Alignment} - \text{Total Number of Gaps in Alignment}).$$

Variant: The term "variant" means a polypeptide having lipolytic enzyme activity comprising an alteration, i.e., a substitution, insertion, and/or deletion, at one or more (e.g., several) positions. A substitution means replacement of the amino acid occupying a position with a different amino acid; a deletion means removal of the amino acid occupying a position; and an insertion means adding an amino acid adjacent to and immediately following the amino acid occupying a position.

Improved property: When the lipolytic enzyme according to the invention is incorporated into a dough in effective amounts, one or more properties of the dough or of the baked product obtained therefrom may be improved relative to a dough or a baked product in which the lipolytic enzyme according to the invention is not incorporated.

The term "improved property" is defined herein as any property of a dough and/or a product obtained from the dough, particularly a baked product, which is improved by the action of the lipolytic enzyme according to the invention or by the baking composition according to the invention relative to a dough or product in which the lipolytic enzyme or composition according to the invention is not incorporated.

The improved property may include, but is not limited to, increased strength of the dough, increased elasticity of the dough, increased stability, reduced stickiness of the dough, improved extensibility of the dough, improved machineability of the dough, increased volume of the baked product, improved flavor of the baked product, and/or improved crumb structure of the baked product.

The improved property may be determined by comparison of a dough and/or a baked product prepared with and without addition of the lipolytic enzyme according to the invention, e.g., in accordance with the methods described below.

Organoleptic qualities may be evaluated using procedures well established in the baking industry, and may include, for example, the use of a panel of trained taste-testers.

Increased strength: The term "increased strength of the dough" is defined herein as the property of a dough that has generally more elastic properties and/or requires more work input to mould and shape.

Increased elasticity: The term "increased elasticity of the dough" is defined herein as the property of a dough which has a higher tendency to regain its original shape after being subjected to a certain physical strain.

Increased stability of the dough: The term "increased stability of the dough" is defined herein as the property of a dough that is less susceptible to mechanical abuse thus better maintaining its shape and volume and is evaluated by the ratio of height: width of a cross section of a loaf after normal and/or extended proof.

Reduced stickiness of the dough: The term "reduced stickiness of the dough" is defined herein as the property of a dough that has less tendency to adhere to surfaces, e.g. in the dough production machinery, and is either evaluated empirically by the skilled test baker or measured by the use of a texture analyser (e.g. TAXT2) as known in the art.

Improved extensibility: The term "improved extensibility of the dough" is defined herein as the property of a dough that can be subjected to increased strain or stretching without rupture.

Improved machineability: The term "improved machineability of the dough" is defined herein as the property of a dough that is generally less sticky and/or more firm and/or more elastic.

Increased volume of the baked product: The term "increased volume of the baked product" is measured as the volume of a given baked product wherein a lipolytic enzyme (as the only enzyme) is/is not added. The volume may be determined, e.g., by the rape seed displacement method, or by the method shown in Example 2.

Improved crumb structure of the baked product: The term "improved crumb structure of the baked product" is defined herein as the property of a baked product with finer cells and/or thinner cell walls in the crumb and/or more uniform/homogenous distribution of cells in the crumb and is usually evaluated visually by the baker or by digital image analysis as known in the art (e.g., C-cell, Calibre Control International Ltd, Appleton, Warrington, UK).

Improved whiteness of the crumb: Crumb fineness is often evaluated by measuring whiteness of the bread crumb, because finer crumb structure reflects the light in a manner making the crumb appear more white. The whiteness of the crumb may be measured as known in the art, e.g., by using the HunterLab L-value measured with a color scanner.

Improved crumb softness of the baked product: The term "improved crumb softness of the baked product" is the opposite of "firmness" and is defined herein as the property of a baked product that is more easily compressed and is evaluated either empirically by the skilled test baker/sensory panel or measured by the use of a texture analyzer (e.g., TAXT2 or TA-XT Plus from Stable Micro Systems Ltd, Surrey, UK) as known in the art.

Improved anti-staling of the baked product: The term "improved anti-staling of the baked product" is defined herein as the properties of a baked product that have a reduced rate of deterioration of quality parameters, e.g., softness and/or elasticity, during storage.

Improved flavor of the baked product: The term "improved flavor of the baked product" is evaluated by a trained test panel.

DETAILED DESCRIPTION OF THE INVENTION

The invention provides a method for preparing a dough or a baked product prepared from the dough which method comprises adding a lipolytic enzyme to the dough. The invention also provides baking compositions, pre-mix, dough, and baked products.

Lipolytic Enzymes

According to the present invention, "a lipolytic enzyme" comprises an enzyme having lipase, phospholipase and/or galactolipase activity (glyceroglycolipid lipase) activity. The term "lipolytic enzyme" is used interchangeably with the term "polypeptides having lipolytic activity".

Polypeptides having lipolytic enzyme activity which are suitable for use in the present invention include polypeptides selected from the group consisting of;

(i) a polypeptide having an amino acid sequence which has at least 50% sequence identity to the amino acids 20-254 of SEQ ID NO: 1;

(ii) a variant of the amino acids 20-254 of SEQ ID NO: 1 comprising a substitution, a deletion, and/or an insertion at one or more (e.g. several) positions; and (iii) a fragment of the polypeptide of (i), or (ii) that has lipolytic enzyme activity.

According to the present invention, a preferred polypeptide having lipolytic enzyme activity which is suitable for use in the present invention include polypeptides having an amino acid sequence which has at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, at least 99.5%, or even 100 sequence identity to the amino acids 20-254 of SEQ ID NO: 1.

In another aspect, the lipolytic enzyme according to the invention comprises or consists of the amino acids 20-254 of SEQ ID NO: 1.

In one aspect, the lipolytic enzyme according to the invention differs by no more than 10 amino acids, e.g., 1, 2, 3, 4, 5, 6, 7, 8, 9, or 10 from the amino acids 20-254 of SEQ ID NO: 1.

The polypeptide of SEQ ID NO: 1 or a fragment thereof may be used to design nucleic acid probes to identify and clone DNA encoding polypeptides having lipolytic enzyme activity from strains of different genera or species according to methods well known in the art (Sambrook et al., 1989, *Molecular Cloning, A Laboratory Manual,* 2d edition, Cold Spring Harbor, N.Y.).

In particular, such probes can be used for hybridization with the genomic DNA or cDNA of a cell of interest, following standard Southern blotting procedures, in order to identify and isolate the corresponding gene therein. Such probes can be considerably shorter than the entire sequence, but should be at least 15, e.g., at least 25, at least 35, or at least 70 nucleotides in length. Preferably, the nucleic acid probe is at least 100 nucleotides in length, e.g., at least 200 nucleotides, at least 300 nucleotides, at least 400 nucleotides, at least 500 nucleotides, at least 600 nucleotides, at least 700 nucleotides, or at least 800 nucleotides in length. Both DNA and RNA probes can be used. The probes are typically labeled for detecting the corresponding gene (for example, with $^{32}P$, $^{3}H$, $^{35}S$, biotin, or avidin). Such probes are encompassed by the present invention.

A genomic DNA or cDNA library prepared from such other strains may be screened for DNA that hybridizes with the probes described above and encodes a polypeptide having lipolytic enzyme activity. Genomic or other DNA from such other strains may be separated by agarose or polyacrylamide gel electrophoresis, or other separation techniques. DNA from the libraries or the separated DNA may be transferred to and immobilized on nitrocellulose or other suitable carrier material.

In another embodiment, the lipolytic enzyme suitable for use in the present invention is a variant of the amino acids 20-254 of SEQ ID NO: 1 comprising a substitution, a deletion, and/or an insertion at one or more (e.g., several) positions.

In an embodiment, the number of amino acid substitutions, deletions and/or insertions introduced into the amino acids 20-254 of SEQ ID NO: 1 is not more than 10, e.g., 1, 2, 3, 4, 5, 6, 7, 8, 9 or 10.

The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function, such as a poly-histidine tract, an antigenic epitope or a binding domain.

Examples of conservative substitutions are within the groups of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, *In, The Proteins*, Academic Press, New York. Common substitutions are Ala/Ser, Val/Ile, Asp/Glu, Thr/Ser, Ala/Gly, Ala/Thr, Ser/Asn, Ala/Val, Ser/Gly, Tyr/Phe, Ala/Pro, Lys/Arg, Asp/Asn, Leu/Ile, Leu/Val, Ala/Glu, and Asp/Gly.

Single or multiple amino acid substitutions, deletions, and/or insertions can be made and tested using known methods of mutagenesis, recombination, and/or shuffling, followed by a relevant screening procedure, such as those disclosed by Reidhaar-Olson and Sauer, 1988, *Science* 241: 53-57; Bowie and Sauer, 1989, *Proc. Natl. Acad. Sci. USA* 86: 2152-2156; WO 95/17413; or WO 95/22625. Other methods that can be used include error-prone PCR, phage display (e.g. Lowman et al., 1991, *Biochemistry* 30: 10832-10837; U.S. Pat. No. 5,223,409; WO 92/06204), and region-directed mutagenesis (Derbyshire et al., 1986, *Gene* 46: 145; Ner et al., 1988, *DNA* 7: 127).

Mutagenesis/shuffling methods can be combined with high-throughput, automated screening methods to detect activity of cloned, mutagenized polypeptides expressed by host cells (Ness et al., 1999, *Nature Biotechnology* 17: 893-896). Mutagenized DNA molecules that encode active polypeptides can be recovered from the host cells and rapidly sequenced using standard methods in the art. These methods allow the rapid determination of the importance of individual amino acid residues in a polypeptide.

Sources of Lipolytic Enzymes

A polypeptide having lipolytic enzyme activity may be obtained from microorganisms of any genus.

In particular, the polypeptide may be a fungal polypeptide. For example, the polypeptide may be a yeast polypeptide such as a *Candida, Kluyveromyces, Pichia, Saccharomyces, Schizosaccharomyces*, or *Yarrowia* polypeptide; or a filamentous fungal polypeptide such as an *Acremonium, Agaricus, Alternaria, Aspergillus, Aureobasidium, Botryosphaeria, Ceriporiopsis, Chaetomidium, Chrysosporium, Claviceps, Cochliobolus, Coprinopsis, Coptotermes, Corynascus, Cryphonectria, Cryptococcus, Diplodia, Exidia, Filibasidium, Fusarium, Gibberella, Holomastigotoides, Humicola, Irpex, Lentinula, Leptospaeria, Magnaporthe, Melanocarpus, Meripilus, Mucor, Myceliophthora, Neocallimastix, Neurospora, Paecilomyces, Penicillium, Phanerochaete, Piromyces, Poitrasia, Pseudoplectania, Pseudotrichonympha, Rasamsonia, Rhizomucor, Schizophyllum, Scytalidium, Talaromyces, Thermoascus, Thielavia, Tolypocladium, Trichoderma, Trichophaea, Verticillium, Volvariella*, or *Xylaria* polypeptide.

In another aspect, the polypeptide is an *Acremonium cellulolyticus, Aspergillus aculeatus, Aspergillus awamori, Aspergillus foetidus, Aspergillus fumigatus, Aspergillus japonicus, Aspergillus nidulans, Aspergillus niger, Aspergillus oryzae, Aspergillus tamarii, Chrysosporium inops, Chrysosporium keratinophilum, Chrysosporium lucknowense, Chrysosporium merdarium, Chrysosporium pannicola, Chrysosporium queenslandicum, Chrysosporium tropicum, Chrysosporium zonatum, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola grisea, Humicola insolens, Humicola lanuginosa, Irpex lacteus, Mucor miehei, Myceliophthora thermophila, Neurospora crassa, Penicillium funiculosum, Penicillium purpurogenum, Penicillium samsonianum, Phanerochaete chrysosporium, Rasamsonia brevistipitata, Talaromyces leycettanus, Thielavia achromatica, Thielavia albomyces, Thielavia albopilosa, Thielavia australeinsis, Thielavia fimeti, Thielavia microspora, Thielavia ovispora, Thielavia peruviana, Thielavia setosa, Thielavia spededonium, Thielavia subthermophila, Thielavia terrestris, Trichoderma harzianum, Trichoderma koningii, Trichoderma longibrachiatum, Trichoderma reesei*, or *Trichoderma viride* polypeptide.

Strains of these species are readily accessible to the public in a number of culture collections, such as the American Type Culture Collection (ATCC), Deutsche Sammlung von Mikroorganismen and Zellkulturen GmbH (DSMZ), Centraalbureau Voor Schimmelcultures (CBS), and Agricultural Research Service Patent Culture Collection, Northern Regional Research Center (NRRL).

The polypeptide may be identified and obtained from other sources including microorganisms isolated from nature (e.g., soil, composts, water, etc.) or DNA samples obtained directly from natural materials (e.g., soil, composts, water, etc.) using the above-mentioned probes. Techniques for isolating microorganisms and DNA directly from natural habitats are well known in the art. A polynucleotide encoding the polypeptide may then be obtained by similarly screening a genomic DNA or cDNA library of another microorganism or mixed DNA sample. Once a polynucleotide encoding a polypeptide has been detected with the probe(s), the polynucleotide can be isolated or cloned by utilizing techniques that are known to those of ordinary skill in the art.

Emulsifiers

The lipolytic enzyme according to the invention may be used with and without an emulsifier.

The amount of emulsifier in the dough will typically be lower if both a lipolytic enzyme and an emulsifier are added to the dough compared to a dough wherein no lipolytic enzyme is added.

A suitable emulsifier for use in the present invention is preferably an emulsifier selected from the group consisting of diacetyl tartaric acid esters of monoglycerides (DATEM), calcium stearoyl lactylate (CSL), ethoxylated mono- and diglycerides (EMG), polysorbates (PS), and succinylated monoglycerides (SMG).

Baking Compositions Comprising a Lipolytic Enzyme

The present invention relates to baking compositions comprising a lipolytic enzyme having an amino acid sequence which has at least 50% sequence identity to the polypeptide of SEQ ID NO: 1, and one or more baking ingredients.

In particular, the present invention relates to baking compositions comprising a lipolytic enzyme having an amino acid sequence which has at least 50% sequence identity to the polypeptide of SEQ ID NO: 1, and one or more baking ingredients, wherein the compositions suitable for increasing the loaf volume of a baked product.

The composition may further comprise one or more additional enzymes, in particular amylase, alpha-amylase, maltogenic alpha-amylase, beta-amylase, glucan-1,4-alpha-maltotetrahydrolase, aminopeptidase, carboxypeptidase, catalase, chitinase, cyclodextrin glycosyltransferase, deoxyribonuclease, lipolytic enzyme, galactanase, alpha-galactosidase, beta-galactosidase, glucanase, glucoamylase, glucose oxidase, alpha-glucosidase, beta-glucosidase, haloperoxidase, invertase, laccase, lipase, mannanase, mannosidase, oxidase, pectinolytic enzymes, peptidoglutaminase, peroxidase, phospholipase, phytase, polyphenoloxidase, protease, and xylanase.

The composition may in particular comprise a lipolytic enzyme according to the invention and a phospholipase.

The composition may be prepared in accordance with methods known in the art and may have any physical appearance such as liquid, paste or solid. For instance, the composition may be formulated using methods known to the art of formulating enzymes and/or pharmaceutical products, e.g., into coated or uncoated granules or micro-granules. The lipolytic enzyme, optionally the emulsifier, and any additional enzymes to be included in the composition may be stabilized in accordance with methods known in the art, e.g., by stabilizing the polypeptide in the composition by adding an antioxidant or reducing agent to limit oxidation or the polypeptide, or it may be stabilized by adding polymers such as PVP, PVA, PEG or other suitable polymers known to be beneficial to the stability of polypeptides in solid or liquid compositions.

When formulating a lipolytic enzyme as a granulate or agglomerated powder, the particles will typically have a narrow particle size distribution with more than 95% (by weight) of the particles in the range from 25 to 500 µm. Granulates and agglomerated powders may be prepared by conventional methods, e.g., by spraying the lipolytic enzyme onto a carrier in a fluid-bed granulator. The carrier may consist of particulate cores having a suitable particle size. The carrier may be soluble or insoluble, e.g., a salt (such as NaCl or sodium sulphate), a sugar (such as sucrose or lactose), a sugar alcohol (such as sorbitol), starch, rice, corn grits, or soy. The composition is preferably in the form of a dry powder or a granulate, in particular a non-dusting granulate.

The baking composition may be prepared by mixing the lipolytic enzyme of the invention with a suitable carrier such as flour, starch, a sugar, a complex carbohydrate such as maltodextrin, or a salt. The baking composition may contain other dough and/or bread additives, e.g., any of the additives, including enzymes, mentioned herein.

The Additional Enzymes

Optionally, additional enzymes, such as amylase, alpha-amylase, maltogenic alpha-amylase, beta-amylase, glucan 1,4-alpha-maltotetrahydrolase, aminopeptidase, carboxypeptidase, catalase, chitinase, cyclodextrin glycosyltransferase, deoxyribonuclease, lipolytic enzyme, galactanase, alpha-galactosidase, beta-galactosidase, glucanase, glucoamylase, glucose oxidase, alpha-glucosidase, beta-glucosidase, haloperoxidase, invertase, laccase, lipase, mannanase, mannosidase, oxidase, pectinolytic enzymes, peptidoglutaminase, peroxidase, phospholipase, phytase, polyphenoloxidase, protease, and xylanase may be used together with the lipolytic enzyme according to the present invention.

The additional enzyme may be of any origin, including mammalian and plant, and preferably of microbial (bacterial, yeast or fungal) origin.

The amylase may be fungal or bacterial, e.g., a maltogenic alpha-amylase from *B. stearothermophilus* or an alpha-amylase from *Bacillus*, e.g., *B. licheniformis* or *B. amyloliquefaciens*, a beta-amylase, e.g., from plant (e.g., soy bean) or from microbial sources (e.g., *Bacillus*), or a fungal alpha-amylase, e.g., from *A. oryzae*.

Suitable commercial fungal alpha-amylase compositions include, e.g., BAKEZYME P 500™ (available from DSM) and FUNGAMYL 2500 SG™, FUNGAMYL 4000 BG™, FUNGAMYL 800 L™, FUNGAMYL ULTRA BG™ and FUNGAMYL ULTRA SG™ (available from Novozymes NS).

Suitable commercial maltogenic alpha-amylases include NOVAMYL™, NOVAMYL PRO™, and NOVAMYL 3D™ (available from Novozymes NS).

An amylase for use in the invention may also include a G4 amylase (glucan 1,4-alpha-maltotetrahydrolase (EC 3.2.1.60)), e.g., from *Pseudomonas* saccharophila or variants thereof, e.g., such as any of the amylases disclosed in WO1999/050399, WO2004/111217 or WO2005/003339.

The glucoamylase for use in the present invention includes glucoamylases having a sequence identity of at least 50%, at least 60%, at least 65%, at least 70%, at least 75%, at least 80%, at least 85%, at least 90%, at least 95%, at least 96%, at least 97%, at least 98%, or at least 99% to the amino acid sequence of the *A. niger* G1 or G2 glucoamylase (Boel et al. (1984), EMBO J. 3 (5), p. 1097-1102), the *A. awamori* glucoamylase disclosed in WO 84/02921, or the *A. oryzae* glucoamylase (Agric. Biol. Chem. (1991), 55 (4), p. 941-949).

Suitable commercial glucoamylases include GoldCrust BG™ (available from Novozymes NS).

The glucose oxidase may be a fungal glucose oxidase, in particular an *Aspergillus niger* glucose oxidase (such as GLUZYME™, available from Novozymes NS, Denmark).

The hemicellulase may be a pentosanase, e.g., a xylanase which may be of microbial origin, e.g., derived from a bacterium or fungus, such as a strain of *Aspergillus*, in particular of *A. aculeatus*, *A. niger*, *A. awamori*, or A.

tubigensis, or from a strain of *Trichoderma*, e.g., *T. reesei*, or from a strain of *Humicola*, e.g., *H. insolens*.

Suitable commercially available xylanase preparations for use in the present invention include PANZEA BG™, PENTOPAN MONO BG™ and PENTOPAN 500 BG™ (available from Novozymes NS), GRINDAMYL POWERBAKE™ (available from Danisco), and BAKEZYME BXP 5000™ and BAKEZYME BXP 5001™ (available from DSM).

The protease may be from *Bacillus*, e.g., *B. amyloliquefaciens*.

The phospholipase may have phospholipase A1, A2, B, C, D, or lysophospholipase activity; it may or may not have lipase activity. It may be of animal origin, e.g., from pancreas, snake venom or bee venom, or it may be of microbial origin, e.g., from filamentous fungi, yeast or bacteria, such as *Aspergillus* or *Fusarium*, e.g., *A. niger*, *A. oryzae* or *F. oxysporum*. A preferred lipase/phospholipase from *Fusarium oxysporum* is disclosed in WO 98/26057. Also, the variants described in WO 00/32758 may be used.

Suitable phospholipase compositions are LIPOPAN F™ and LIPOPAN XTRA™ (available from Novozymes NS) or PANAMORE GOLDEN™ and PANAMORE SPRING™ (available from DSM).

Suitable commercial lipase preparations are, e.g., LIPOPAN™, e.g., LIPOPAN™ 50 BG available from Novozymes NS.

Dough

The invention discloses a method for preparing a dough or a baked product prepared from the dough which method comprises incorporating into the dough a lipolytic enzyme according to the invention.

In another aspect, the invention provides a dough comprising flour, water, and an effective amount of a baking composition.

The present invention also relates to methods for preparing a dough or a baked product comprising incorporating into the dough an effective amount of a baking composition of the present invention which improves one or more properties of the dough and/or the baked product obtained from the dough relative to a dough or a baked product in which the lipolytic enzyme is not incorporated.

The phrase "incorporating into the dough" is defined herein as adding the baking composition according to the invention to the dough, to any ingredient from which the dough is to be made, and/or to any mixture of dough ingredients from which the dough is to be made.

In other words, the baking composition of the invention may be added in any step of the dough preparation and may be added in one, two, or more steps. The composition may be added to the ingredients of a dough that is kneaded and baked, using methods well known in the art.

The term "effective amount" is defined herein as an amount of baking composition according to the invention that is sufficient for providing a measurable effect on at least one property of interest of the dough and/or baked product.

The term "dough" is defined herein as a mixture of flour and other ingredients firm enough to knead or roll.

The dough of the invention may comprise flour derived from any cereal grain, including wheat, barley, rye, oat, corn, sorghum, rice, millet, and any mixtures thereof.

The lipolytic enzyme according to the invention is particularly useful for dough comprising whole grain; especially for dough comprising whole wheat.

The dough may also comprise other conventional dough ingredients, e.g., proteins, such as milk powder, gluten, and soy; eggs (either whole eggs, egg yolks, or egg whites); an oxidant such as ascorbic acid, potassium bromate, potassium iodate, azodicarbonamide (ADA), or ammonium persulfate; an amino acid such as L-cysteine; a starch; and/or a salt such as sodium chloride, calcium acetate, sodium sulfate or calcium sulfate.

The starch may be wheat starch, corn starch, maize starch, tapioca starch, cassava starch, potato starch; and/or a sugar such as sucrose, cane sugar, lactose, or high fructose corn syrup.

The dough may comprise fat (triglyceride) such as granulated fat or shortening.

The dough of the invention may be fresh, frozen, or par-baked (pre-baked).

The dough of the invention is normally a leavened dough or a dough to be subjected to leavening. The dough may be leavened in various ways, such as by adding chemical leavening agents, e.g., sodium bicarbonate or by adding a leaven (fermenting dough), but it is preferred to leaven the dough by adding a suitable yeast culture, such as a culture of *Saccharomyces cerevisiae* (baker's yeast), e.g., a commercially available strain of *S. cerevisiae*.

The amount of the lipolytic enzyme according to the invention in the dough may be between 0.01-100 mg enzyme protein per kg flour, in particular 0.05-50 mg enzyme protein per kg flour, in particular 0.05-25 mg enzyme protein per kg flour, in particular 0.05-10 mg enzyme protein per kg flour.

Industrial Processes

The present invention is particularly useful for preparing dough and baked products in industrialized processes in which the dough used to prepare the baked products are prepared mechanically using automated or semi-automated equipment.

The process of preparing bread generally involves the sequential steps of dough making (with an optional proofing step), sheeting or dividing, shaping or rolling, and proofing, the dough, which steps are well known in the art.

If the optional proofing step is used, preferably more flour is added and alkali may be added to neutralize acid produced or to be produced during the second proofing step. In an industrial baked production process according to the present invention, one or more of these steps is/are performed using automated or semi-automated equipment.

Baked Product

The process of the invention may be used for any kind of baked or steamed product prepared from dough (including fibre dough), either of a soft or a crisp character, either of a white, light or dark type.

Examples of baked products are bread typically in the form of loaves or rolls, pan bread, toast bread, pan bread with and without lid, buns, hamburger buns, rolls, baguettes, brown bread, whole meal bread, rich bread, bran bread, flat bread, tortilla, pita, Arabic bread, Indian flat bread, steamed bread, and any variety thereof.

The present invention is further described by the following examples that should not be construed as limiting the scope of the invention.

Example 1

Cloning, Expression and Fermentation (SEQ ID NO:1)

Genomic DNA was extracted from an *Aspergillus oryzae* strain (IFO 4177, Japan, received 1982) using Fast DNA Spin for Soil Kit (Cat no. 6560-200 from MP Biochemicals), following the protocol from the supplier.

(SEQ ID NO. 1 and 2) were amplified by PCR from the genomic DNA. The PCR was composed of 1 µl of genomic DNA of the strain; 2.5 µl of cloning primer forward (SEQ ID NO: 3) (10 pmol/µl), 2.5 µl of primer cloning primer reverse (SEQ ID NO: 4) (10 pmol/µl), 25 µl of iProof HF Master Mix (BioRad Cataloge #172-5310), and 19 µl PCR-grade water.

The amplification reaction was performed using a Thermal Cycler programmed for 2 minutes at 98° C. followed by 30 cycles each at 98° C. for 10 seconds, and 60° C. for 10 seconds, followed by one cycle at 72° C. for 5 minutes.

```
SEQ ID NO. 1 (Signal: 1-19):
MHLAIKSLFVSLLGASVLASPLPSNALVERNAPLNEFLSALLSHLPAID

GTIDAVSGVITDFDQLLADLTGARTTQNGYIGVCTDYTVLFARGTSEPG

NVGVLVGPPLSEAFEQAVGAKALSFQGVNGYNADVAGYLAGGDAAGSKS

MASLASEVLSKCPDTKLVMSGYSQGCQIVHNAVEQLPAADASKISSVLL

FGDPYAGKAFPNVDASRVHTVCHAGDTICNNSVVILPPHLTYAVDVTNA

VQFAVAAAN

SEQ ID NO. 2:
ATGCATCTTGCTATCAAGTCTCTCTTTGTCTCTCTCCTCGGAGCCAGCG

TTCTCGCAAGCCCTCTTCCCAGCAATGCTCTGGTTGAGAGAAACGCTCC

CCTGAATGAGTTCCTCAGCGCTCTTCTGTCGCATCTGCCTGCCATCGAT

GGCACCATCGACGCGGTGTCGGGTGTGATCACCGATTTTGATCAATTGC

TCGCCGACCTCACTGGTGCTCGAACCACACAAAATGGATATATTGGTGT

CTGCACGGACTACACCGTTCTCTTCGCCCGCGGAACCAGTGAGCCCGGA

AACGTAAGCTTCGTTGCCTTAGTGCTTATTTCCATTCTAACTTTGTGCA

GGTCGGTGTCCTTGTTGGACCTCCTCTTTCTGAAGCGTTTGAGCAAGCC

GTCGGTGCAAAAGCCTTGAGCTTCCAGGGCGTCAACGGCTATAACGCAG

ATGTCGCGGGTTATTTGGCTGGAGGTGACGCTGCCGGTAGCAAGTCAAT

GTACGTCTCTTCTCTATTGTGTCGCAACCTTCTCGCTCTATTCCGATGG

ACAATGAAAATCGCAGCTGACATTATTCGAACAGGGCATCCCTGGCCAG

CGAAGTTCTCTCCAAATGTCCTGACACTAAGCTCGTCATGAGCGGCTAC

TCTCAGGGTTGCCAGATTGTTCACAACGCCGTTGAGCAGCTCCCTGCCG

CAGACGCTAGCAAGATCAGCAGCGTCCTCCTCTTCGGAGACCCATGTAC

GTTAAATTCCAAGGCCGTGGGGATTATTGATGTATGAAACATGCTGATT

ATTTTATAGACGCGGGCAAGGCCTTCCCCAACGTTGATGCTTCCCGTGT

GCACACTGTGTGCCACGCCGGAGATACTATTTGCAACAACAGCGTCGTT

ATCCTGCCCCCTCACCTGACCTACGCTGTTGATGTGACTAACGCGGTTC

AATTTGCTGTTGCGGCTGCGAACTAA

SEQ ID NO: 3 (primer)
5' ACACAACTGGGGATCCACCATGCATCTTGCTATCAAGTCTCTCTTT

GTCT-3'

SEQ ID NO: 4 (primer)
5' CTAGATCTCGAGAAGCTTGTTCGCAGCCGCAACAGCA-3'
```

4 µl PCR reaction was applied on 1.2% Flashgel (Lonza Catalog no. 57023). The remaining PCR product was purified using a GFX® PCR DNA and Gel Band Purification Kit (GE Healthcare, Hilleroed, Denmark) according to manufacturer's instructions.

The purified PCR product, corresponding to the *Aspergillus oryzae* lipolytic enzyme gene was cloned into the expression vector pDAu109 (WO 2005/042735) previously linearized with Bam HI and Hind III, using an IN-FUSION™ Dry-Down PCR Cloning Kit (BD Biosciences, Palo Alto, Calif., USA) according to the manufacturer's instructions.

One µl volume of the undiluted ligation mixture was used to transform Multi shot TOP 10 Chemical Competent Cells Part no. 44-0091 from Invitrogen. One colony was selected on a LB agar plate containing 100 µg of ampicillin per ml and cultivated overnight in 2 ml of LB medium supplemented with 100 µg of ampicillin per ml.

Plasmid DNA was purified using a Jetquick Plasmid Miniprep Spin Kit (Genomed GmbH, Løhne, Germany) according to the manufacturer's instructions. The *Aspergillus oryzae* lipolytic enzyme gene sequence was verified by Sanger sequencing before heterologous expression.

One plasmid (containing gene SEQ ID NO: 2) was selected for heterologous expression of the lipolytic enzyme gene in an *Aspergillus oryzae* host cell as known in the art.

Example 2

Effect of a Lipolytic Enzyme (SEQ ID NO:1) in Baking

Buns were made using the recipe described in Table 1 in 10 gram flour scale.

TABLE 1

| Ingredient | Amount |
|---|---|
| Flour (Kolibri flour) % | 100 |
| Water % | 62 |
| Yeast % | 4.5 |
| Sucrose % | 1.5 |
| Salt % | 1.5 |
| Ascorbic acid (ppm) | 40 |

The buns were made according to the following procedure:
1. 10 g Kolibri flour (Meneba, The Netherlands) was scaled.
2. A yeast solution (solution 1) was prepared consisting of 60 g compressed yeast and 90 g water. The yeast solution was kept suspended using a magnetic stirrer.
3. An ascorbic acid solution (solution 2) was prepared by dissolving 0.3 g ascorbic acid in 12.5 g water.
4. An ascorbic acid, sucrose, and salt solution (solution 3) was prepared by mixing 21.6 g salt, 21.6 g sucrose, 2.4 ml of solution 2, and 256.8 g water.
5. The flour (10 g), solution 1 (1.13 ml), solution 3 (1.94 ml), and enzyme according to Table 2 was added to a miniaturized pin mixer National MFG, Lincoln, Nebr. US.
6. Additional water was added so that the total water amounted to 6.2 g water/dough.
7. The ingredients were mixed for 4.5 min at 90 rpm into a dough.
8. The dough was shaped into a bun by hand.
9. The dough was placed on the conveyer belt of the proofing tunnel and was proofed at 86% RH, 32° C. for 55 min.
10. Following the proofing, the dough was baked in a miniaturized tunnel oven for 13 min at 230° C.
11. The bun was allowed to cool down for 30 min.
12. The weight of the bun was determined using a balance and was then covered by a thin layer of paraffin.

13. The volume was determined using the water displacement method.

The paraffin covered bun was immersed down into a beaker with water standing on a balance.

The volume of the bun corresponds to the force needed to fully immerse the bun into the water and was read on the balance.

TABLE 2

Dosing of enzymes

| | 1 | 2 | 3 | 4 | 5 | 6 |
|---|---|---|---|---|---|---|
| SEQ ID NO: 1 (mg EP/kg) | | | | 0.5 | 1 | 3 |

Results

The result can be found in Table 3. All enzyme treatments were done in triplicates.

The lipolytic enzyme SEQ ID NO:1 was able to increase the specific volume of the bud from 3.4 to 4.2 ml/g.

TABLE 3

Effect of lipolytic enzyme according to the invention on volume of buns

| | Spec. Volume (ml/g) | Spec. volume index (%) |
|---|---|---|
| Control | 3.4 | 100 |
| SEQ ID NO: 1 (0.5 mg EP/kg) | 4.1 | 120 |
| SEQ ID NO: 1 (1 mg EP/kg) | 4.2 | 123 |
| SEQ ID NO: 1 (3 mg EP/kg) | 4.1 | 119 |

Example 3

Lipolytic Enzyme (SEQ ID NO:1) in Bread Comprising Whole Wheat

Bread was prepared using a straight dough procedure according to below recipe and process conditions. All chemicals applied were food grade. Fungamyl 2500 BG (2500 FAU/g) is available from Novozymes NS.

Lipolytic enzymes (SEQ ID NO:1) was made as described in Example 1.

TABLE 4

Dough Recipe

| Ingredient | Amount (on flour basis) |
|---|---|
| Flour<br>40% Kolibri (Meneba, NL)<br>60% Victory Landmel N+<br>(HavneMøllerne, DK) | 100% |
| Tap water | 64% |
| Yeast (fresh) | 3.4% |
| Sucrose | 1.5% |
| Salt | 1.5% |
| Ascorbic acid | 24 ppm |
| Calcium Propionate | 0.3% |
| Fungamyl 2500 BG (Novozymes A/S) | 10 FAU/kg |
| Lipolytic enzyme (SEQ ID No: 1) | 0; 1.5 and 3 mg enzyme protein/kg Flour |

Procedure:

All ingredients were weighed out. Salt, sucrose, yeast, ascorbic acid, calcium propionate and enzyme were added to the mixing bowl. Tap water was weighed out, and the temperature adjusted with ice (to approx. 9-10° C. in order to reach a dough temperature of 27° C. after mixing) and added to the mixing bowl. 2500 g flour (1000 g Kolibri and 1500 g Victory) were added to the mixing bowl and all ingredients were mixed for 3 min at 63 rpm and 7 min at 90 rpm using Spiral mixer (DIOSNA Dierks & Söhne GmbH, DE). The mixed dough was taken out of the mixing bowl and the temperature was controlled.

The dough was divided into pieces of 450 g each, rounded by hand, where after they rested for 15 min at room temperature covered by plastic. The rested dough pieces were shaped into breads in a sheeter (M0671 MPB-001, Glimek, SE) and transferred to greased 1400 ml pans (Top 230×115×68 mm). The breads were proofed at 32° C. at 86% humidity for 60 min. The proofed breads were baked for 35 min in a deck oven (Piccolo, Wachtel, DE) at 225° C. with steam. The breads were taken out of the pans and allowed to cool to room temperature. The volume of the bread was determined as described under volume determination. Bread crumb characteristics (brightness and number of cells) were evaluated using C-cell as described under C-cell.

Volume Determination:

The specific volume was measured using the Volscan profiler 600 (Stable microsystems, UK) running on the Volscan profiler software. Each bread was mounted in the machine. The weight of each loaf was automatically determined with the built-in balance of the Volscan instrument. The volume of each loaf was calculated from a 3D image created by the instrument when each loaf of bread was rotated with a speed of 1.5 revolutions per second while it was scanned with a laser beam taking 3 mm vertical steps per revolution. Specific volume was calculated for each bread according to the following formula:

Specific volume(ml/g)=volume(ml)/weight(g)

The reported value was the average of 2 breads from the same dough.

C-Cell

2×2 cm thick slices from the middle of the breads were scanned in a C-Cell (Calibre Instruments Ltd, Warrington, UK) using the standard method for collecting images and the standard C-Cell software for data analysis.

TABLE 5

Results

| | Control | 1.5 mg EP/kg flour | 3 mg EP/kg flour |
|---|---|---|---|
| Bread Specific volume (ml/g) | 4.32 | 4.49 | 4.46 |
| Slice Brightness | 115 | 125 | 126 |
| Number of cells | 4907 | 5389 | 5633 |

Conclusion

Addition of the lipolytic enzyme (SEQ ID No: 1) improved specific volume significantly. In addition, the bread crumb was brighter and finer.

Example 4

Effect of Lipolytic Enzymes According to the Invention in Baking

The following additional lipolytic enzymes were cloned in an *Aspergillus oryzae* host strain according to standard procedures as known in the art:

SEQ ID NO: 5 (obtained from *Penicillium* sp, China, 2011):
MILQLRYLAL IFFGLHAYAV PLADREVHHL KERGAGLNSF

LNFLLSYLPA INTSITDATG LITDFDKLLG GLTGAQTTYN

ELGGACTAYT VIFARGTAEP GNVGVLVGPP LFDALDDKFG

SSALTIQGVN GYSASVQGYL AGGDPSGSAS MANQIKAAKA

QCPKTKLIAS GYSQGCQIVH NAISQLDATT ASWISSVLLF

GDPLKGQALK NVPASRVFTA CHALDDICKD GLIIGPSHLT

YAIDVTNAAN FAAAV

SEQ ID NO: 6 (obtained from *Penicillium samsonianum*, China, 2016):
MLFKLEFMLL TLLGLNTYAT PLPAASEMQL TKRDAGLNAF

LGILIDHLPA VSESLTESTS LITSFDKLLG ALTGAQETYN

EAGGTCKEWT VVFARGTAEP GNVGVLVGPP LFDALADKFG

RSALTIQGVN DYSASVQGYL AGGDAAGTAE MARQIESVKS

QCPDTKLIAS GYSQGCQIVH NAVAKLEATT ASWISSVLLF

GDPKDKQALS NIPASKVYTA CHAG DDICKN GVLIGPPHLT

YALDVTDAVA FAANAA

SEQ ID NO: 7 (obtained from *Rasamsonia brevistipitata*, Germany, bought from CBS):
MLSKLSIGAL LPFFLGTLAS PLPVPADLSL LVERNAPLNQ

FLSLLVDYLP AINETLSDAS SVITGLDTVL ADVLDLQTTY

NQLGSGSCTA YTLLFARGTS EPGNVGVLVG PPLFMALQTL

INPSDLTIQG VNNYAASIEG YLEGGDPAGS AEMAQQIQQA

HSACPNTKLI VSGYSQGSQI VHNAIGQLPA ATASWISSVL

LFGDPDDGQA LPSVAASKVN TVCHDGDDIC SNGIFILPAH

LTYAENVATA ASFALAAAS

SEQ ID NO: 8 (obtained from *Penicillium* sp, China, 2016):
MFFKLQSLAV IFLGLNAYAF PLAEPNEVHI SERGAGLNSF

LNILLSHLPA IDTSITDATG IITSFDNLLG ALTGAQETYN

ELGGSCTEWT VIFARGTAEP GNVGVLVGPP LFDAMDDKFG

TSAITIQGVN DYSASVQGYL AGGDSNGSAE MARQIKAAKS

QCPHTKLIAS GYSQGCQIVH KAIAQLDSTT ASWISSVLLF

GDPLKGQALN SVPSSRVFTA CHALDDICKN GILIGPSHLT

YAVDVVNAVN FAAAH

SEQ ID NO: 9 (obtained from *Aspergillus tamarii*, Egypt, 1992):
MHLPIKTLFV SLLGASVLAR PLPNDALVER NAPLNEFLSV

LLSHLPAING SITAVSGLIT DFDQLLADIT GAQTTLNGFT

GACTDYTVLF ARGTSEPGNV GVLVGPPLAE AFEGAVGASA

LSFQGVNGYS ASVEGYLAGG EAAGSKAMAS QASDILSKCP

DTKLVMSGYS QGCQIVHNAV EQLPAEHASK ISSVLLFGDP

YKGKALPNVD ASRVHTVCHA GDTICENSVI ILPAHLTYAV

DVASAADFAV AAAKN

SEQ ID No: 10 (obtained from *Talaromyces leycettanus*, UK, 1968, bought from CBS):
MLLPIKSFLL SAFALNALAT PLPVPEEHAN VKRESALNEY

LSIILSNLPV INGAINDVVG VLSSFEQLIA SLTGAQTTYN

ELGGPCTEYT IVFARGTSEP GNVGVLVGPP LFEALQNLVG

TSALTIQGVN NYAASVEGYL EGGDPAGSAE MASQIEAALS

QCPNTKLIAA GYSQGCQVTH NAIGKLPASV GSKISSVLLF

GDPDDGQALP NVPASK VMTV CHTGDDICQD GVLILPPHLT

YGEDAQAAAA FAVAAAS

SEQ ID NO: 5 has an amino acid sequence identity of 63% to amino acids 20-254 of SEQ ID NO: 1.

SEQ ID NO: 6 has an amino acid sequence identity of 59% to amino acids 20-254 of SEQ ID NO: 1.

SEQ ID NO: 7 has an amino acid sequence identity of 60% to amino acids 20-254 of SEQ ID NO: 1.

SEQ ID NO: 8 has an amino acid sequence identity of 61% to amino acids 20-254 of SEQ ID NO: 1.

SEQ ID NO: 9 has an amino acid sequence identity of 85% to amino acids 20-254 of SEQ ID NO: 1.

SEQ ID NO: 10 has an amino acid sequence identity of 61% to amino acids 20-254 of SEQ ID NO: 1.

The lipolytic enzymes (SEQ ID NO:1, SEQ ID NO:5, SEQ ID NO:6, SEQ ID NO:7, SEQ ID NO:8, SEQ ID NO:9, and SEQ ID NO:10) were tested in buns using the recipe described in Table 6.

TABLE 6

| Ingredient | Amount |
| --- | --- |
| Flour (Kolibri flour)% | 100 |
| Water % | 60 |
| Yeast % | 4.5 |
| Sucrose % | 1.5 |
| Salt % | 1.5 |
| Ascorbic acid (ppm) | 40 |

The buns were made according to the following procedure:
1. 100 g Kolibri flour (Meneba, The Netherlands) was scaled.
2. A yeast solution (solution 1) was prepared consisting of 60 g compressed yeast (Malteserkors gaer, Denmark) and 90 g water. The yeast solution was kept suspended using a magnetic stirrer.
3. An ascorbic acid solution (solution 2) was prepared by dissolving 0.3 g ascorbic acid in 12.5 g water.
4. An ascorbic acid, sucrose, and salt solution (solution 3) was prepared by mixing 21.6 g salt, 21.6 g sucrose, 2.4 ml of solution 2, and 256.8 g water.
5. The flour (100 g), solution 1 (11.25 ml), solution 3 (19.4 ml), and the lipolytic enzyme (1 mg EP/kg flour and 5 mg EP/kg flour) was added to a 200 gram pin mixer National MFG, Lincoln, Nebr. US.
6. Additional water was added so that the total water amounted to 60 g water/dough.
7. The ingredients were mixed for 4.5 min at 90 rpm into a dough.
8. The dough was scaled into 6 doughs of 18 grams each.
9. The dough was shaped into a bun by hand.
10. Three of the 18 gr doughs from each large dough were placed in a lidded pan to be used for texture and brightness measurement, and 3 of the 18 gr doughs were placed in an open pan to be used for volume determination.
11. The doughs were placed on the conveyer belt of the proofing tunnel and was proofed at 80% RH, 36° C. for 60 min.
12. Following the proofing, the dough was baked in a miniaturized tunnel oven for 13 min at 220° C.
13. The bun was allowed to cool down for 30 min.
14. The weight of the bun was determined using a balance.
15. The volume was determined using an automatic volume scanner, Videometer A/S, Hørsholm, DK. The buns pass on a conveyor belt, as the bun passes through, the bun is photographed from 3 directions and a 3D model of the bun is created from the images. The volume is calculated based on the 3D model.
16. The specific volume is calculated by dividing the volume by the weight and is reported as ml/g.
17. The Specific volume index of each lipolytic enzyme and dosage is calculated as Specific volume index=100×Spec. volume of bun with lipolytic enzyme/Spec. volume of control bun and is reported as %.

Results

The result can be found in Table 7. All enzyme treatments were done in triplicates.

TABLE 7

Effect of the lipolytic enzyme according to the invention on volume of buns

|  | 1 mg EP/kg flour | | 5 mg EP/kg flour | |
| --- | --- | --- | --- | --- |
|  | Spec. Volume (ml/g) | Spec. volume index (%) | Spec. Volume (ml/g) | Spec. volume index (%) |
| Control | 3.76 | 100 | 3.76 | 100 |
| SEQ ID NO: 5 | 4.73 | 125.6 | 4.70 | 125 |
| SEQ ID NO: 6 | 4.51 | 119.8 | 4.88 | 129.6 |
| SEQ ID NO: 7 | 4.43 | 117.6 | 4.70 | 124.8 |
| SEQ ID NO: 8 | 4.98 | 132.2 | 4.71 | 125.1 |
| SEQ ID NO: 9 | 4.81 | 127.8 | 4.82 | 127.9 |
| SEQ ID NO: 10 | 4.54 | 120.4 | 4.67 | 124 |
| SEQ ID NO: 1 | 4.99 | 132.5 | 4.56 | 121.2 |

Conclusion: The lipolytic enzymes according to the invention were able to increase the specific volume index of the bun by at least 20% compared to a control.

Effect of Lipolytic Enzymes on Bread Crumb Firmness

The bread was stored in a plastic bag at room temperature. The texture of the buns was measured after 7 days of storage. Crumb firmness was measured by a TA.XT Plus texture analyzer from Stable Micro Systems, Godalmine, UK.

The breads for the firmness determination on day 7 were baked in lidded pans to have constant volume. The top of the bread was cut off so that the height of the samples was 25 mm. The probe was lowered into the sample with a speed of 2 mm/s until the sample had been compressed to 30%. The force required to do this compression was measured in g and equals firmness of the crumb.

TABLE 8

Firmness determination on day 7.
The following results were obtained, measured in firmness (in grams):

|  | 1 mg EP/kg flour | 5 mg EP/kg flour |
| --- | --- | --- |
| Control | 1000 | 1000 |
| SEQ ID NO: 2 | 750 | 750 |
| SEQ ID NO: 3 | 600 | 650 |
| SEQ ID NO: 4 | 750 | 650 |
| SEQ ID NO: 5 | 600 | 650 |
| SEQ ID NO: 6 | 575 | 600 |
| SEQ ID NO: 7 | 600 | 550 |
| SEQ ID NO: 1 | 550 | 600 |

Conclusion: The buns treated with the lipolytic enzymes according to the invention had a significantly softer crumb compared to the control.

Effect of Lipolytic Enzymes on Brightness

The color was measured using a MiniScan EZ 4500L, HunterLab, Reston Va., USA. The MiniScan illuminates the sample with a xenon flash lamp, the light reflected is then separated into its component wave lengths. The results are presented as Brightness (L), Red/Green (a) and yellow/blue (b). The 'l' value describes how bright the sample is where 100 is white and 0 is black. The 'a' value describes how the color varies between green and red where a positive value (a+) corresponds to green and a negative value (a−) corresponds to red. The 'b' value describes how the color varies between yellow and blue where a positive value (b+) corresponds to yellow and a negative value (b−) corresponds to blue.

The breads for the crumb brightness determination were baked in lidded pans to have constant volume. The top of the bread was cut off so that the brightness of the center of the crumb was determined. The results from the brightness measurements can be found in Table 9. All of the tested lipolytic enzymes increased the brightness compared to a control without added lipolytic enzyme. The brightness increased from 77 to between 78-81 depending on the lipolytic enzyme and dose.

TABLE 9

Brightness (L) values of bread crumb treated with different levels of lipases.

|  | 1 mg EP/kg flour | 5 mg EP/kg flour |
| --- | --- | --- |
| Control | 77 |  |
| SEQ ID NO: 2 | 80 | 81.5 |
| SEQ ID NO: 3 | 78 | 79.5 |
| SEQ ID NO: 4 | 78 | 80 |
| SEQ ID NO: 5 | 81 | 81 |
| SEQ ID NO: 6 | 81 | 82 |
| SEQ ID NO: 7 | 78 | 78 |
| SEQ ID NO: 1 | 80.5 | 82 |

Conclusion: The buns treated with the lipolytic enzymes according to the invention had a significantly brighter crumb compared to the control.

The invention claimed is:

1. A method for preparing a dough or a baked product prepared from the dough which method comprises incorporating into the dough a lipolytic enzyme, wherein the lipolytic enzyme has an amino acid sequence which has at least 80% sequence identity to amino acids 20 to 254 of SEQ ID NO: 1 and has lipolytic activity.

2. The method of claim 1, wherein the lipolytic enzyme has an amino acid sequence which has at least 85% sequence identity to amino acids 20 to 254 of SEQ ID NO: 1.

3. The method of claim 1, wherein the lipolytic enzyme has an amino acid sequence which has at least 90% sequence identity to amino acids 20 to 254 of SEQ ID NO: 1.

4. The method of claim 1, wherein the lipolytic enzyme has an amino acid sequence which has at least 95% sequence identity to amino acids 20 to 254 of SEQ ID NO: 1.

5. The method of claim 1, wherein the lipolytic enzyme comprises an amino acid sequence of amino acids 20 to 254 of SEQ ID NO: 1.

6. The method of claim 1, wherein the volume of the dough and/or the baked product is increased compared to a dough wherein no lipolytic enzyme is added.

7. The method of claim 1, wherein the lipolytic enzyme is applied in an amount of 0.01-100 mg enzyme protein per kg flour in the dough.

8. The method of claim 1, which further comprises adding to the dough one or more enzymes selected from the group consisting of alpha-amylase, maltogenic alpha-amylase, beta-amylase, glucan-1,4-alpha-maltotetrahydrolase, aminopeptidase, carboxypeptidase, catalase, chitinase, cyclodextrin glycosyltransferase, deoxyribonuclease, galactanase, alpha-galactosidase, beta-galactosidase, glucanase, glucoamylase, glucose oxidase, alpha-glucosidase, beta-glucosidase, haloperoxidase, invertase, laccase, lipolytic enzyme, mannanase, mannosidase, oxidase, pectinolytic enzymes, peptidoglutaminase, peroxidase, phytase, polyphenoloxidase, protease, and xylanase.

9. The method of claim 1, wherein the dough comprises flour selected from the group consisting of wheat, barley, rye, oat, corn, sorghum, rice, millet, and any mixtures thereof.

10. The method of claim 1, wherein the dough comprises whole wheat.

11. The method of claim 1, wherein the dough is made to a baked product or a steamed product.

12. The method of claim 1, which further comprising adding to the dough a phospholipase.

13. A baking composition comprising a lipolytic enzyme having an amino acid sequence which has at least 80% sequence identity to amino acids 20 to 254 of SEQ ID NO: 1 and has lipolytic activity, and one or more baking ingredients.

14. The baking composition of claim 13, wherein the lipolytic enzyme has an amino acid sequence which has at least 85% sequence identity to amino acids 20 to 254 of SEQ ID NO: 1.

15. The baking composition of claim 13, wherein the lipolytic enzyme has an amino acid sequence which has at least 90% sequence identity to amino acids 20 to 254 of SEQ ID NO: 1.

16. The baking composition of claim 13, wherein the lipolytic enzyme has an amino acid sequence which has at least 95% sequence identity to amino acids 20 to 254 of SEQ ID NO: 1.

17. The baking composition of claim 13, wherein the lipolytic enzyme comprises an amino acid sequence of amino acids 20 to 254 of SEQ ID NO: 1.

18. The baking composition of claim 13, wherein the baking composition is in granular form or a stabilized liquid.

19. The baking composition of claim 13, wherein the baking ingredients are selected from the group consisting of flour, yeast, starch, salt, and ascorbic acid.

20. The baking composition of claim 13, which further comprises one or more enzymes selected from the group consisting of alpha-amylase, maltogenic alpha-amylase, beta-amylase, glucan-1,4-alpha-maltotetrahydrolase, aminopeptidase, carboxypeptidase, catalase, chitinase, cyclodextrin glycosyltransferase, deoxyribonuclease, galactanase, alpha-galactosidase, beta-galactosidase, glucanase, glucoamylase, glucose oxidase, alpha-glucosidase, beta-glucosidase, haloperoxidase, invertase, laccase, lipolytic enzyme, mannanase, mannosidase, oxidase, pectinolytic enzymes, peptidoglutaminase, peroxidase, phytase, polyphenoloxidase, protease, and xylanase.

* * * * *